United States Patent
Myeong et al.

(10) Patent No.: US 7,485,796 B2
(45) Date of Patent: Feb. 3, 2009

(54) APPARATUS AND METHOD FOR PROVIDING MUSIC FILE SEARCH FUNCTION

(75) Inventors: Hyeon Myeong, Hwaseong-si (KR);
Chang-kyu Choi, Seongnam-si (KR);
Yeun-bae Kim, Seongnam-si (KR);
Min-kyu Park, Seongnam-si (KR);
Yong-beom Lee, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 20 days.

(21) Appl. No.: 11/431,025

(22) Filed: May 10, 2006

(65) Prior Publication Data

US 2007/0006717 A1 Jan. 11, 2007

(30) Foreign Application Priority Data

Jul. 11, 2005 (KR) .................... 10-2005-0062334

(51) Int. Cl.
*G06F 3/16* (2006.01)
(52) U.S. Cl. .................... 84/609; 715/727; 381/310
(58) Field of Classification Search .............. 707/104.1; 84/609; 700/94; 715/727, 729, 865, 978; 434/116; 381/310
See application file for complete search history.

(56) References Cited

U.S. PATENT DOCUMENTS

| 6,226,618 | B1 * | 5/2001 | Downs et al. ................ 705/1 |
| 7,308,325 | B2 * | 12/2007 | Coles et al. ................ 700/94 |
| 2003/0185110 | A1 | 10/2003 | Fujisawa | |
| 2005/0219963 | A1 | 10/2005 | Fujisawa | |
| 2006/0251263 | A1 * | 11/2006 | Vronay ........................ 381/17 |

FOREIGN PATENT DOCUMENTS

| JP | 2000-236600 | 8/2000 |
| JP | 2002-074911 | 3/2002 |

(Continued)

OTHER PUBLICATIONS

Hiipakka, J., and G. Lorho, "A spatial audio user intertace tot generating music playlists," Proc. of the 2003 Int'l Conf. on Auditory Display, Boston, MA, Jul. 6-9, 2003, pp. 267-270.*

(Continued)

*Primary Examiner*—Walter Benson
*Assistant Examiner*—Andrew R Millikin
(74) *Attorney, Agent, or Firm*—Staas & Halsey LLP (57) ABSTRACT

An apparatus and a method for providing music file search function. The apparatus includes an input unit that receives an input of an attribute of a music file to be played, an extract unit that extracts a characteristic segment from the music file according to the input attribute, a 3D-sound generating unit that generates 3D sound from the characteristic segment of the music file along a spatial axis corresponding to the attribute, and an output unit that outputs the 3D sound. The method includes the steps of inputting an attribute of a music file to be played, searching a characteristic segment of the music file according to the input attribute, generating 3D sound from the characteristic segment of the music file along a spatial-axis corresponding to the attribute, and outputting the 3D sound.

20 Claims, 5 Drawing Sheets

FOREIGN PATENT DOCUMENTS

| | | |
|---|---|---|
| JP | 2003-030964 | 1/2003 |
| JP | 2003-132659 | 5/2003 |
| KR | 10-2003-0056248 | 8/2003 |
| WO | WO 03/010768 | 2/2003 |
| WO | WO 03/051063 | 6/2003 |

OTHER PUBLICATIONS

Korte et al. "A generic direct-manipulation 3D-auditory environment for hierarchical navigation in non-visual interaction." Proceedings of the second annual ACM conference on Assistive technologies, pp. 117-123. 1996. New York, NY.*

Lorho et al. "Structured Menu Presentation Using Spatial Sound Separation." Proceedings of the 4th International Symposium on Mobile Human-Computer Interaction, pp. 419-424. 2002. London, UK.*

Kobayashi, M. and Schmandt, C. 1997. Dynamic Soundscape: mapping time to space for audio browsing. In Proceedings of the SIGCHI Conference on Human Factors in Computing Systems (Atlanta, Georgia, United States, Mar. 22-27, 1997). S. Pemberton, Ed. CHI '97. ACM, New York, NY, 194-201. DOI= http://doi.acm.org/10.1145/258549.258702.*

Pauws, S., Bouwhuis, D., and Eggen, B. 2000. Programming and enjoying music with your eyes closed. In Proceedings of the SIGCHI Conference on Human Factors in Computing Systems (The Hague, The Netherlands, Apr. 1-6, 2000). CHI '00. ACM, New York, NY, 376-383. DOI= http://doi.acm.org/10.1145/332040.332460.*

Schmandt, C. and Mullins, A. 1995. AudioStreamer: exploiting simultaneity for listening. In Conference Companion on Human Factors in Computing Systems (Denver, Colorado, United States, May 7-11, 1995). I. Katz, R. Mack, and L. Marks, Eds. CHI '95. ACM, New York, NY, 218-219. DOI= http://doi.acm.org/10.1145/223355.223533.*

Japanese Office Action for corresponding Japanese Patent Application No. 2006-178497 dated Dec. 11, 2008 (4 pgs).

Hiipakka et al., "A Spatial Audio User Interface For Generating Music Playlists", Boston, MA, Jul. 2003, pp. 4 (in English).

Japanese Office Action for corresponding Japanese Patent Application No. 2006-178497 dated Apr. 8, 2008, pp. 9.

Japanese Office Action for corresponding Japanese Patent Application No. 2006-178497 dated Aug. 28, 2007 (pp. 1-4) (in English).

Japanese Office Action for corresponding Japanese Patent Application No. 2006-178497 dated Aug. 28, 2007.

* cited by examiner

APPARATUS AND METHOD FOR PROVIDING MUSIC FILE SEARCH FUNCTION

CROSS-REFERENCE TO RELATED APPLICATION

This application is based on and claims priority from Korean Patent Application No. 10-2005-0062334 filed on Jul. 11, 2005 in the Korean Intellectual Property Office, the disclosure of which is incorporated herein by reference.

BACKGROUND OF THE INVENTION

1. Field of the Invention

The present invention relates to an apparatus and a method for providing a music file search function. More particularly, the present invention relates to an apparatus and a method for providing a music file search function, in which a characteristic segment of each stored music file is generated by using a three-dimensional (3D) sound effect.

2. Description of Related Art

Innovations in digital audio signal processing technologies have led to the development of MP3 (Moving Picture Experts Group Layer-3 Audio) portable audio players, in which audio files stored in a flash memory in MP3 format can be played for a prolonged period of time up to hours.

MP3 players are advantageous in that they are compact, which eliminates the need for much larger and bulkier storage mediums such as cassette tapes and compact disks (CDs). Further, music files can be stored in a relatively small flash memory and played repeatedly without having degradation in sound quality.

As a means for storing MP3 music files, a flash memory instead of CDs or mini disks (MDs) are used to make the resulting MP3 players compact and stable. To increase the data storage capacity, there are MP3 players that support a compact flash card (CF card), a secure digital card (SD card), a smart media card (SM card), a multimedia card (MMC), and a memory stick, in addition to MP3 players implemented with a hard disk having a considerably large data storage capacity.

Currently, flash memories having data storage capacities of 128 MB to 1 GB and hard disks having data storage capacities of 5 GB to 100 GB are used in MP3 players. Generally, a 4-minute MP3 file has approximately 4 MB of data at the sampling rate of 44.1 kHz and at the bit rate of 128 kbps. Therefore, approximately 30 to 25,000 MP3 files can be stored in a single MP3 player. That is, as the storage capacity increases, the number of MP3 files that can be stored in an MP3 player increases. However, this makes it difficult for a user to select the music files stored in MP3 players.

New MP3 players currently available have a liquid crystal display (LCD) as a display unit on which information on the current track being played and a list of music files are typically displayed, which allows users to easily select songs from the stored music files. By using a button provided on the MP3 players, users can browse or navigate through the list of music files displayed to select and play songs corresponding to the music files.

Further, MP3 players not having an LCD panel are also available. However, these devices play music files in the order they were stored or in a random order, and since there can be hundreds or thousands of songs stored in an MP3 player, the process of selecting a particular song from a massive amount of music files stored in the MP3 player can be a difficult or even formidable process for users.

In conventional music players (such as cassette players, CD players, and MD players) that play about 20 songs, it is not difficult for users to keep track of songs. However, increase in the storage capacity of MP3 players not having provided with a display unit makes it difficult to browse and select songs.

Korean Patent Application No. 10-2003-0056248 discloses an MP3 player for an automobile audio/visual (A/V) system and a method of selecting music files in the MP3 player, in which a user can store, delete, display the titles and artists of songs, and play music files compressed in MP3 format. The MP3 player has a sort button which allows the user to browse the titles and artists of songs in an arranged order.

However, the above-described MP3 player has no other way of searching the music file than navigating through the stored music files arranged by the titles and artists of songs, and it is essential that the MP3 player be equipped with a display unit to display the list of music files.

BRIEF SUMMARY

An aspect of the invention provides an apparatus and a method for providing a music file search function, in which a characteristic segment of each stored music file are generated by using a three-dimensional (3D) sound effect.

An aspect of the invention provides an apparatus and a method for providing a music file search function, in which a characteristic segment of each stored music file are generated according to attributes of the music file by using a three-dimensional (3D) sound effect.

According to an aspect of the present invention, there is provided an apparatus for providing a music file search function. The apparatus includes an input unit that receives an input of an attribute of a music file to be played, an extract unit that extracts a characteristic segment from the music file according to the input attribute, a 3D-sound generating unit that generates 3D sound from the characteristic segment of the music file along a spatial-axis corresponding to the attribute, and an output unit that outputs the 3D sound.

According to another aspect of the present invention, there is provided a method of providing a music file search function. The method includes the steps of inputting an attribute of a music file to be played, extracting a characteristic segment from the music file according to the input attribute, generating 3D sound from the characteristic segment of the music file along a spatial-axis corresponding to the attribute, and outputting the 3D sound.

According to another embodiment of the present invention, there is provided a method of shortening a time for file searching. The method includes determining a characteristic segment of a stored file according to an inputted attribute of the file, generating, from the characteristic segment, a directional 3D sound effect along a spatial-axis, the 3D sound effect corresponding to the attribute, and playing the characteristic segment of the file using the directional 3D sound effect.

According to another aspect of the present invention, there are provided a computer-readable storage media encoded with processing instructions for causing a processor to execute the aforementioned methods.

Additional and/or other aspects and advantages of the present invention will be set forth in part in the description which follows and, in part, will be obvious from the description, or may be learned by practice of the invention.

BRIEF DESCRIPTION OF THE DRAWINGS

The above and/or other aspects and advantages of the present invention will become apparent and more readily appreciated from the following detailed description, taken in conjunction with the accompanying drawings of which.

DETAILED DESCRIPTION OF EMBODIMENTS

Reference will now be made in detail to embodiments of the present invention, examples of which are illustrated in the accompanying drawings, wherein like reference numerals refer to the like elements throughout. The embodiments are described below in order to explain the present invention by referring to the figures.

Figure 1:
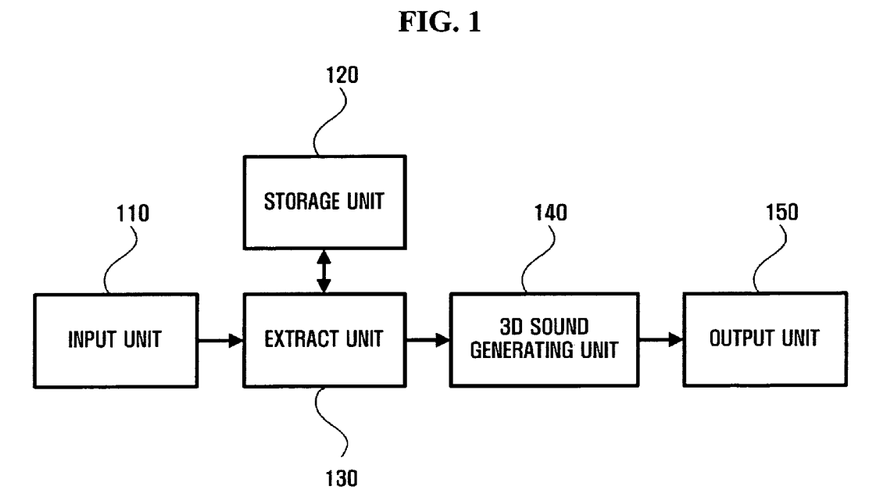
FIG. 1 is a block diagram illustrating an apparatus that provides a music file search function, according to an embodiment of the present invention.

FIG. 1 is a block diagram illustrating an apparatus which provides a music file function. The apparatus includes a storage unit 120, an input unit 110, an extract unit 130, a 3D-sound generating unit 140, and an output unit 150.

The storage unit 120 stores music files, each of which may contain attributes such as a tempo, a mood, a genre, a year, and an album. The attributes may be either edited by a user or downloaded from a content provider. That is, a music file tagged with an attribute is stored in the storage unit 120.

In addition, a characteristic segment of a music file may be stored according to an attribute thereof. The characteristic segment of the music file may include a distinctive (climax) segment of the music file or a segment selected by a user. The characteristic segment of the music file is converted into 3D sound and played via the output unit 150. The distinctive segment refers to a segment having maximum energy present therein or a segment in which the same melodies are repeated. Both a bit of the distinctive segment and an introductory portion of the music may be played together in order for the user to easily identify and search music files in a shortest time possible.

In addition, the characteristic segment of a music file may be directly selected by a user by selecting a segment and setting it as the characteristic segment of the music file. The distinctive segment or the segment selected by the user as the characteristic segment is copied and stored in the storage unit 120. A beginning portion and an end portion of the characteristic segment may be included in additional information of the music file. The distinctive segment may be stored after being detected by a distinctive-segment detecting unit (not shown).

A flash memory, a hard disk, a CF card, an SF card, an SM card, an MMC card or a memory stick may be employed as the storage unit 120.

The input unit 110 inputs the attribute of the music file using, by way of a non-limiting example, a button or a wheel provided on the apparatus. The attributes, as mentioned above, may include a tempo, a mood, a genre, a year, and an album of the music file, and the user may select the attribute of the music file using the button or the wheel. The user may preset three of the attributes of the music file in such a way that the three attributes respectively correspond to three axes in a three-dimensional (3D) space. Thereafter, the user may select one of the three preset attributes and assign it to one of the three axes.

Input can be made by the user through the input unit 110 while performing extraction in the extract unit 130. The user may switch the attribute of the music file by controlling the extract unit 130 to switch the extract direction, and enter control commands such as play, stop, pause, previous track, next track, and search-speed adjustment. A process of performing input operation via the input unit 110 will be described in detail with reference to FIG. 4.

The extract unit 130 extracts the characteristic segment from the music file in the storage unit 120 according to the attribute selected by the user. For example, the extract unit 130 extracts the characteristic segment from the music file in the storage unit 120 according to the tempo of the music file, if the attribute is set to tempo.

The extract unit 130 continues to extract according to the attribute of the music file which has been set, i.e., it continuously extracts at a faster or slower tempo, and sends the extracted characteristic segment from the music file to the 3D-sound generating unit 140. The tempo may be increased or decreased by the user, and the extraction speed may be adjusted.

As described above, the characteristic segment of the music file extracted by the extract unit 130 may be stored in the storage unit 120 or extracted from the music file according to additional information attached to the music file. That is, the extract unit 130 may extract the distinctive segment from the music file or may extract the segment selected by the user according to the additional information.

The user may switch the attribute of the music file while the extraction is in progress, in which case the extract unit 130 switches extracting according to the switched attribute. For example, if the user sets the attribute to tempo, the extract unit extracts the characteristic segment from the music file according to tempo. If the user switches to mood, the extract unit 130 extracts the characteristic segment from the music file according to the mood of the music file with an identical or similar tempo to the most recent one.

When the user switches to genre, the extract unit 130 extracts the characteristic segment from the music file according to the genre of the music file with identical or similar tempo and genre to the most recent ones.

If the user switches the attribute again, the extract unit 130 extracts for the characteristic segment from the music file according to the switched attribute of the music file with identical or similar attributes to the most recent attributes.

As described above, the user may preset three of the attributes of the music file in such a way that the three attributes respectively correspond to three spatial-axes. Thereafter, the user may select one of the three preset attributes and assign it to one of the three spatial-axes. The output unit 150 outputs the characteristic segment from the music file extracted according to the three attributes respectively corresponding to the three directions in 3D space. If the user has not preset three of the attributes of the music file to correspond to three spatial-axes, the output unit 150 outputs the characteristic segment of the music file according to the switched attribute corresponding to one of the spatial-axes.

For instance, when attributes such as tempo, mood, or genre are selected by the user, 3D sound is generated to create an illusion that the characteristic segment of the music file is approaching te-the user from one of the directions selected, i.e. the front, the back, either side the top or the bottom of the user. This allows the user to easily search all the attributes of the music file on one of the spatial-axes selected as opposed to the three attributes on the three corresponding axes in 3D space. For example, if an attribute set to tempo is switched to mood, search is performed based on the mood of the music file with an identical or similar tempo to the most recent one. If the attribute is switched to genre, search is performed based on the genre of the music file with identical or similar tempo and mood to the most recent ones. If the attribute is switched to year, search is performed based on the year of the music file with identical or similar tempo, mood, and year to the most recent ones. If the attribute is switched to album, search is performed based on the album of the music file with identical or similar tempo, mood, genre, and year to the most recent ones.

If the user switches the attribute again, the characteristic segment from the music file is extracted according to the switched attribute of the music file with identical or similar attributes to the most recently set attributes.

The 3D-sound generating unit 140 generates 3D sound from the characteristic segment extracted by the extract unit 130 along the spatial-axes corresponding to the attributes of the music file set by the user. For example, by defining a virtual line that connects front and back sides of the user to be an X-axis, a virtual line that connects left and right sides of the user to be a Y-axis, and a virtual line that connects upper and lower sides of the user to be a Z-axis, the user may assign tempo, mood, and genre to the X-axis, the Y-axis, and the Z-axis, respectively. If input fed by the input unit 110 is tempo, the extract unit 130 extracts the characteristic segment from the music file according to tempo, and outputs the characteristic segment to the 3D-sound generating unit 140, which generates 3D sound so that the characteristic segments of a plurality of music files are played along the X-axis. As an output method, an illusion that the characteristic segment of the music file is moving from the front to back sides of the user and vice versa may be employed, i.e., an illusion that the user is walking toward or away from the music is produced. Further, multiple speakers are installed on both the right and left sides of the user along the X-axis, and the user can listen to the characteristic segment of the music file emanating from the left or the right side through the illusion mentioned above.

In the same way, if attribute input fed by the input unit 110 is mood, the 3D-sound generating unit 140 generates 3D sound from the characteristic segment of the music file received from the extract unit 130, and plays the characteristic segments of a plurality of music files along the Y-axis, i.e. it creates an illusion that the characteristic segments of the music files "flow" from the right to the left side of the user or vice versa. A full description on playing the characteristic segment of the music file along the axis corresponding to the attribute will be made by referring to FIGS. 3A and 3B.

The output unit 150 such as a speaker, an earphone, and a headphone outputs the 3D sound generated by the 3D-sound generating unit 140. When multiple speakers are employed, a condition called crosstalk, in which audio signals from the multiple speakers are mutually interfered or offset, might occur. A proper measure should be taken to avoid crosstalk. During normal use, it is suggested the user's ears be directly in contact with the earphone or headphone.

Figure 2:
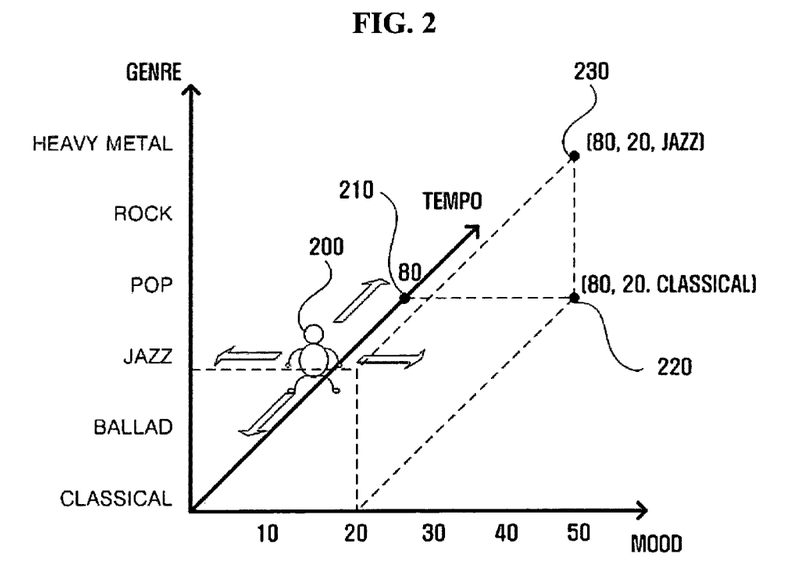
FIG. 2 is a music file search performed by a user by setting three respective attributes of music files to three spatial-axes, according to an embodiment of the present invention.

FIG. 2 is a music file search performed by a user by setting three respective attributes of music files to three spatial axes, according to an embodiment of the present invention. A user in 3D space (hereinafter, referred to as "a virtual user 200") will search for the file by navigating the selected axes. That is, the characteristic segment of the music file is arranged and played in 3D space. The characteristic segment of the music file is arranged along each axis corresponding to the selected attribute, and the virtual user 200 searches the music file by moving along the axes previously selected and listening to the characteristic segment of the music file.

As exemplified in FIG. 2, by defining a virtual line that connects the front and back sides of the virtual user 200 to be an axis denoting the tempo of the music file, a second virtual line that connects the left and right sides of the user to be an axis denoting the mood of the music file, and a third virtual line that connects the upper and the lower sides of the user to be an axis denoting the genre of the music file, the virtual user 200 will experience an illusion that the characteristic segment of the music file is approaching if the virtual user 200 sets the attribute to the tempo of the music file.

While moving along the axis denoting the tempo of the music file, the virtual user 200 can switch the attribute of the music file. For example, the user can switch to mood, and search for the characteristic segment according to the mood of the music file with an identical or similar tempo to the most recent one.

In specific, if the virtual user 200 on a mid-point (0, 0, classic) of all three axes makes 80 steps towards the tempo axis, the coordinates become (80, 0, classic) 210. If the virtual user 200 switches the attribute to mood, and makes 20 steps towards the mood axis, the coordinates in 3D space become (80, 20, classic) 220. If the virtual user 200 switches the attribute to genre and moves towards jazz, the coordinates in 3D space become (80, 20, Jazz) 230.

The virtual user 200 may adjust the speed of searching using, by way of a non-limiting example, a button or a wheel provided on the apparatus and reset the attributes corresponding to each axis.

In addition, the virtual user 200 may adjust the interval between two characteristic segments of the music file to set the total number of 3D sound heard in a given period, i.e. the smaller the interval, the greater number of the audible 3D sound can be heard at a given period.

Figure 3A:
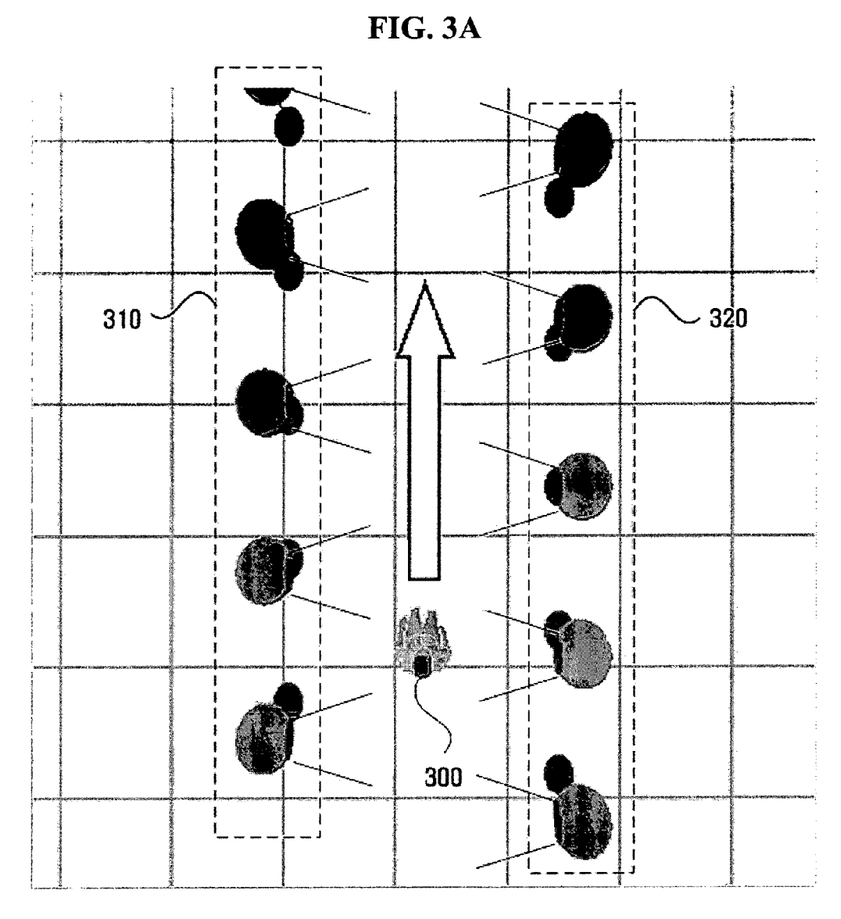
FIG. 3A illustrates output of a characteristic segment of a music file along an axis corresponding to an attribute of the music file selected by the user, according to an embodiment of the present invention.

FIG. 3A is a drawing illustrating a characteristic segment of a music file being played along axes corresponding to attributes selected by a user, according to an embodiment of the present invention. Speakers 310 and 320 outputting the characteristic segment of the music file are arranged along a selected axis in 3D space.

As shown in FIG. 3A, the speakers 310 and 320 outputting the characteristic segment of the music file are arranged in an alternating pattern on both sides of the user along the axis. The virtual user 300 may move back and forth along the axis and listen to the characteristic segment of the music file emanating from the speakers. The sound is output more clearly from one of the sides due to the above-mentioned arrangement. That is, the virtual user 300 can hear the characteristic segment of the closest music file more clearly than others.

According to FIG. 3A, it may appear that the virtual user 300 is moving back and forth with the speakers 310 and 320 on both sides, but the virtual user 300 is actually in a stationary position, and instead the characteristic segment of the music file moves toward or away from the virtual user 300 to give an effect that the virtual user 300 is moving on the axis. The rate at which the characteristic segment of the music file is moved and the interval between the characteristic segments may be reset by the virtual user 300.

The user may perform search while the music file is being played. The music file is played from one of the sides, and the characteristic segment of the music file corresponding to the attribute selected by the user is also played from the other side, i.e. the user may perform search while listeninp to music.

Figure 3B:
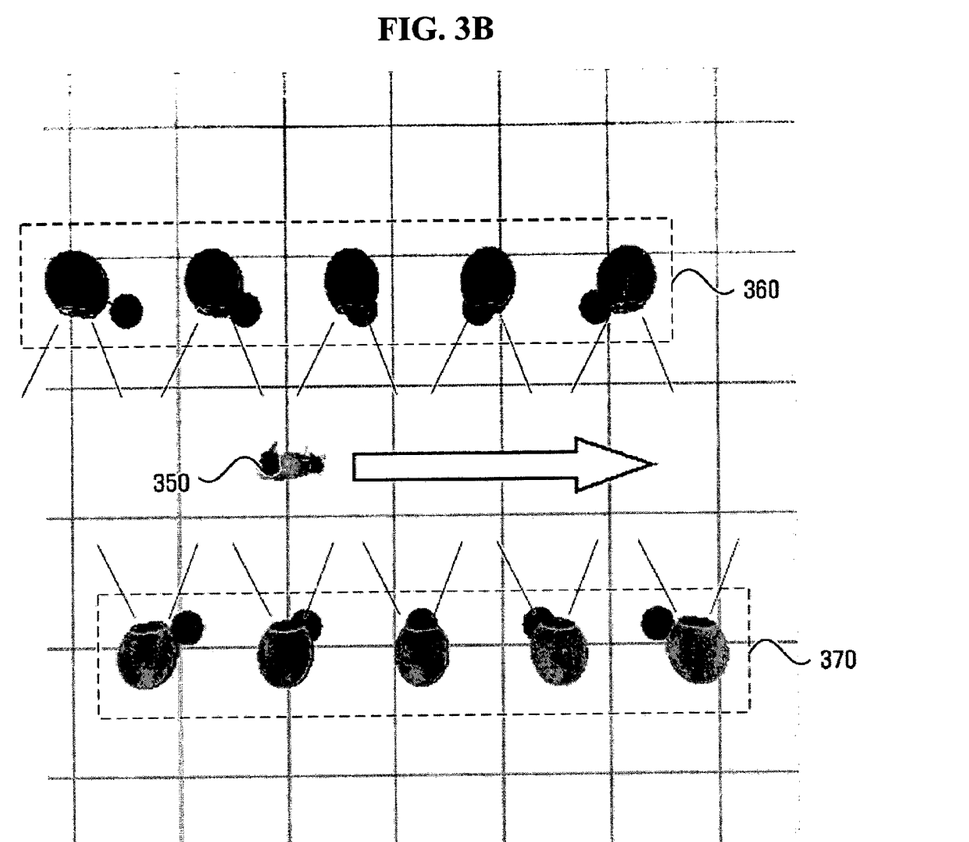
FIG. 3B illustrates output of a characteristic segment of a music file along an axis corresponding to an attribute of the music file selected by the user, according to an embodiment of the present invention.

FIG. 3B is a drawing illustrating a characteristic segment of a music file being played along axes corresponding to attributes selected by a user, according to an embodiment of the present invention. Speakers 360 and 370 outputting the characteristic segment of the music file are arranged along a single axis in 3D space.

As shown in FIG. 3B, the speakers 360 and 370 outputting the characteristic segment of the music file are arranged in an alternating pattern on the front and back sides of the user along the axis. The virtual user 350 may move sideways along the axis and listen to the characteristic segment of the music file emanating from the speakers. The sound is output more clearly from either the front side or the back side due to the above-mentioned arrangement. That is, the virtual user 350 can hear to the characteristic segment of the music file more clearly from either the front side or the back side.

According to FIG. 3B, it may appear that the virtual user 350 is moving sideways with the speakers 36 and 370 on the front and back sides, but the virtual user 350 is actually in a stationary position, and instead the characteristic segment of the music file moves sideways toward the virtual user 350 to give an effect that the virtual user 350 is moving on the axis. The rate at which the characteristic segment of the music file is moved and the interval between the characteristic segments may be reset by the virtual user 350.

The user may perform search while the music file is being played. The music file is played from one of the directions, and the characteristic segment of the music file corresponding to the attribute selected by the user is also played from the other direction according to an embodiment of the present invention.

Figure 4:
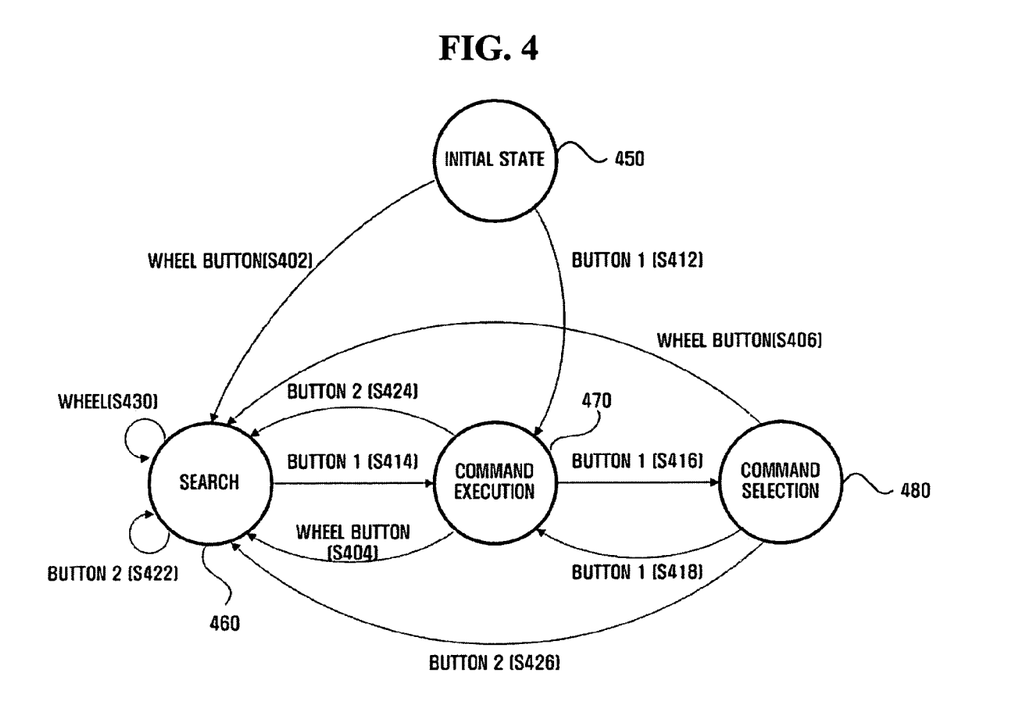
FIG. 4 illustrates changes in the state of the apparatus that provides a music file search function, according to an embodiment of the present invention.

FIG. 4 is a drawing illustrating changes in the state of an apparatus that provides a music file search function, according to an embodiment of the present invention, when the apparatus has one wheel and two buttons.

The apparatus providing the music file search function according to the present invention allows a user to easily search stored music files with just audio signals in absence of a display unit. Once the user becomes familiar with the arrangements of the wheel and the buttons, it will be easy to control the apparatus without looking at the wheel or the buttons, i.e., the user will be able to search and control without the aid of eyesight using the buttons and the wheel that can be conveniently placed in the pocket of the user.

For this reason, it can be advantageous to provide a minimum number of buttons. The input unit 110 according to the present embodiment includes, by way of a non-limiting example, a scroll wheel and two buttons provided therein or in a peripheral remote control device connected to the input unit 110. The number of buttons may be increased or decreased according to the number of functions provided in the apparatus.

The apparatus is in an initial state 450 at the onset of power supply and is able to execute a search 460 or a command 470 such as playback, pause, next track, and previous track. The search 460 can be performed through the wheel (S402), and the command 470 can be executed through a button 1 (S412). The search 460 and the command 470 while in the initial the state 450 may be executed based on the most recently searched or played file, a standard file, or a file selected by the user.

While the search 460 is in progress, the user can control the apparatus to adjust the searching speed or the direction corresponding to the attributes through the wheel (S430), and switch the axis corresponding to the attribute upon receiving a command from a button 2 (S422). The command 470 may be executed using the button 1 (S414) for a selected music file while the search 460 is in progress.

While an operation corresponding to the command 470 is in progress, the apparatus may perform the search 460 according to a command from the wheel button (S404) when manipulated by the user. In addition, the apparatus may execute the command 470 and the search 460 concurrently upon receiving a command from the button 2 (S424) when manipulated by the user. That is, the apparatus plays the music file from the left side of the user in 3D space and the characteristic segment of the music file from the right side of the user in 3D space as shown in FIG. 3A. The apparatus can alternatively play the music file from the back side of the user in 3D space and the characteristic segment of the music file from the front of the user as shown in FIG. 3B.

While the operation corresponding to the command 470 is in progress, the apparatus may execute one of the commands such as stop, pause, previous track, and next track according to a command from the button 1 when manipulated by the user (S416). For example, if the user clicks on the button 1 (S418) while the operation corresponding to the command 470 is in progress, the 3D-sound generating unit generates popup menus in succession in front of the user in response to the command. When the user clicks on the button 1 (S418) again when a desired menu is seen, and the apparatus executes the command 470 according to a command 480.

In the process of selecting commands 480, the apparatus may execute the search 460 according to a command from the button (S406), and execute the command 470 and the search 460 concurrently according to a different command from the button 2 (S426).

Figure 5:
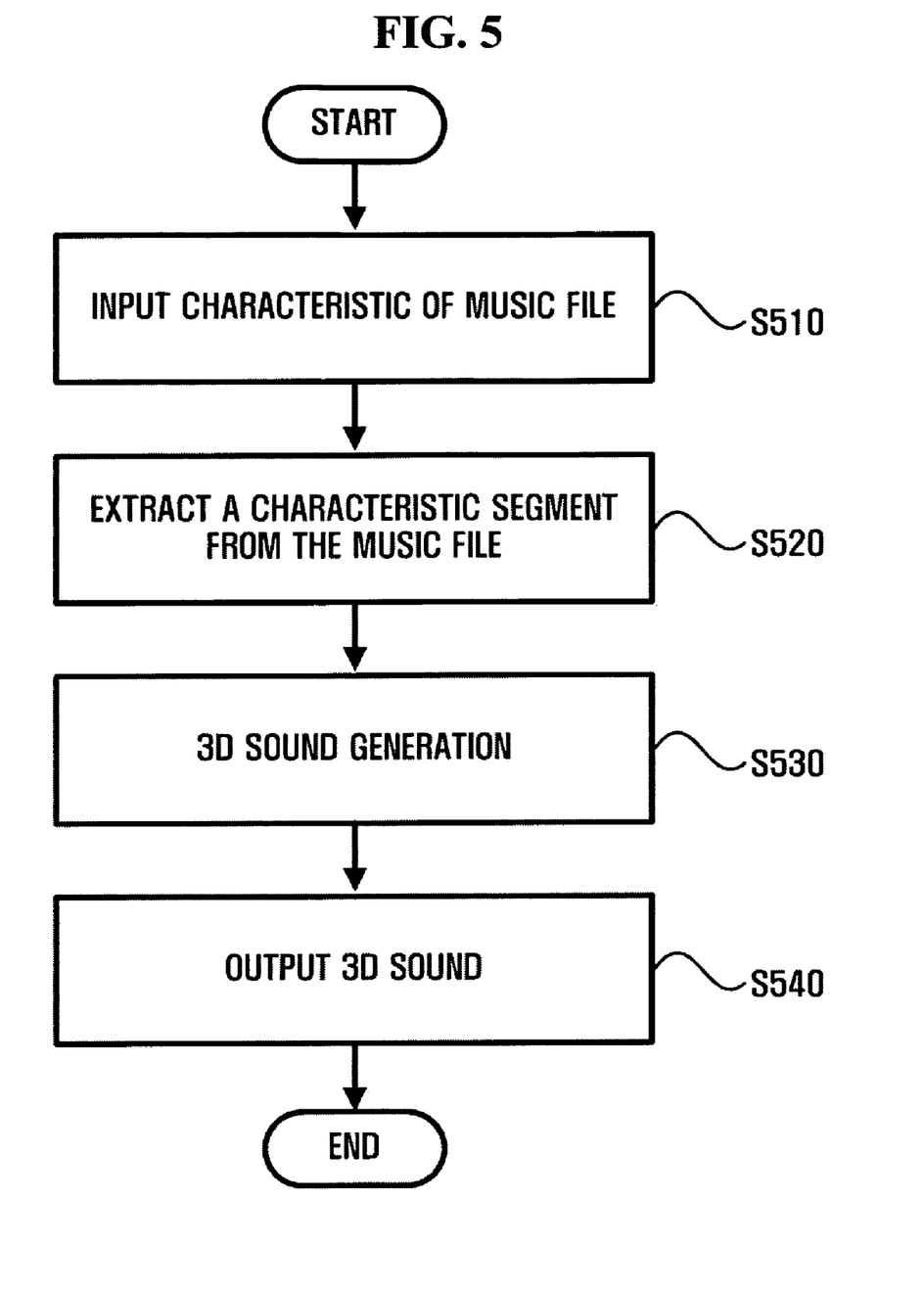
FIG. 5 is a flow chart illustrating a method of providing a music file search function, according to an embodiment of the present invention.

FIG. 5 is a flowchart illustrating a method of providing a music file search function according to an embodiment of the present invention.

In order to provide the music file search function, the input unit 110 receives an attribute of a music file selected by a user (S510). The attribute may include a tempo, a mood, a genre, a year, and an album, and the user may selectively input the attribute using the wheel or the button provided on the apparatus. The user may select another attribute and make a new input using the button or the wheel while the characteristic segment of a selected music file is being outputted, and even while making adjustments on the music file or the selected music file is being played. The attribute of the music file is output to the extract unit 130, which extracts the characteristic segment from the music file in the storage unit 120 according to the selected attribute of the music file. The characteristic segment of the music file to be played first may be extracted from a file selected as a standard from a set of files with the same attribute, or from a file previously selected by the user.

The extract unit 130 extracts the characteristic segment from the music file corresponding to the attribute of the music file selected by the user (S520). The extract unit 130 may extract the characteristic segment from the music file stored in the storage unit 120 through a direct search or by referring to additional information attached to the music file. The extract unit 130 may execute detection in order to extract the distinctive segment, and the characteristic segment of the detected file is output to the 3D-sound generating unit 140.

The 3D-sound generating unit 140 generates 3D sound from the characteristic segment extracted by the extract unit 130 along the spatial-axis corresponding to the attribute of the music file set by the user S530. As a result, the user listening to the characteristic segment of the music file through an earphone or a headphone is able to experience 3D sound.

The generated 3D sound is the characteristic segment of the music file approaching the user along the axis selected by the user in 3D space, which may be generated along the axis corresponding to the attribute of the music file or on one axis selected by the user. The generated 3D sound is output to the output unit 150.

The output unit 150 outputs the 3D sound S540 generated via the 3D-sound generating unit. The output unit 150 may include speakers, a headphone, and earphones but the headphone and the earphones are preferred over to-the speakers. Speakers should be either crosstalk-protected or crosstalk-removed when employed.

According to the above-described embodiments of the present invention, an apparatus and the method providing a music file search function allow a user to search and select a song without a display unit by playing the characteristic segment of a stored music file using directional 3D sound. Further, embodiments of the present invention allows a user to select a desired song within a short period of time by playing the characteristic segment of music files according to selected attributes of the music files by using a 3D sound effect.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. An apparatus for providing a music file search function, the apparatus comprising:
   an input unit that receives an input of a first attribute and of a second attribute different from the first attribute, the attributes being of a music file to be played;
   an extract unit that extracts a first characteristic audio segment from the music file according to the first input attribute and a second characteristic audio segment from the music file according to the second input attribute such that the first and second characteristic audio segments are different; and
   an output unit that outputs the first and second characteristic audio segments as sound.

2. The apparatus of claim 1, wherein the attributes include at least one of a tempo, a mood, a genre, a year an album of the music file.

3. The apparatus of claim 2, wherein three attributes are selectable by a user and are set to three spatial-axes in such a way that each attribute corresponds to each axis.

4. The apparatus of claim 1, wherein the characteristic audio segments of the music file include at least one of a distinctive segment of the music file and a segment of the music file selected by a user.

5. The apparatus of claim 1, wherein the extract unit extracts the characteristic audio segments from the music file according to an attribute selected by a user or by referring to additional information attached to the music file.

6. The apparatus of claim 1, wherein a 3D-sound generating unit generates 3D sound providing an auditory illusion that the characteristic audio segments of the searched music file approach a user from a first direction along a spatial-axis and then retreat from the user to a second direction along the spatial-axis.

7. The apparatus of claim 1, further comprising as storage unit storing the characteristic audio segments of the music file.

8. A method of providing a music file search function, the method comprising: inputting a first attribute of a music file to be played and a second attribute of the music file different from the first attribute;
   searching for a first characteristic audio segment of the music file according to the first input attribute and a second characteristic audio segment of the music file according to the second input attribute such that the first and second characteristic audio segments are different; and
   outputting the first and second characteristic audio segments as sound.

9. The method of claim 8, wherein the attributes include at least one of a tempo, a mood, a genre, a year, an album of the music file.

10. The method of claim 8, wherein three attributes are selectable by a user and are set to three spatial-axes in such a way that each attribute corresponds to each axis.

11. The method of claim 8, wherein the characteristic audio segments of the music file in. include at least one of a distinctive segment of the music file and a segment of the music file selected by a user.

12. The method of claim 8, wherein the characteristic audio segments of the music file are searched in the searching according to the inputted attributes or by referring to additional information attached to the music file.

13. The method of claim 8,"further comprising, generation a 3D sound providing an auditory illusion ". that the characteristic audio segments of the searched music file approach a user from a first direction along a spatial-axis and then retreat from the_user to a second direction along the spatial-axis.

14. The method of claim 8, wherein the characteristic audio segments of the music file to be played first are_extractable from a file selected as a standard from a set of files with the same attribute, or from a file previously selected by the user.

15. A method of shortening a time for file searching, the method comprising:
   determining a first characteristic audio segment of a stored file according to a first input attribute of the file and determining a second characteristic audio segment of the file according to a second input attribute, such that the first and second characteristic audio seciments are different;
   generating, from the first and second characteristic audio segment, a directional 3D sound effects along at least one spatial-axis, the 3D sound effects corresponding to the input attributes and being positioned at different locations from each other along the at least one spatial-axis; and
   playing the first and second characteristic audio segments of the file using the directional 3D sound effects.

16. A computer-readable storage medium encoded with processing instructions for causing a processor to execute a method of providing a music file search function, the method comprising:
   inputting a first attribute of a music file to be played and a second attribute of the music file different from the first attribute;

searching for a first characteristic audio segment of the music file according to the first input attribute and a second characteristic audio segment of the music file according to the second input attribute such that the first and second characteristic audio segments are different; and outputting the first and second characteristic audio segments as sound.

17. A computer-readable storage medium encoded with processing instructions for causing a processor to execute a method of shortening a time for file searching, the method comprising:
   determining a first characteristic audio segment of a stored file according to a first input attribute of the file and determining a second characteristic audio segment of the file according to a second input attribute, such that the first and second characteristic audio segments are different;
   generating, from the first and second characteristic audio segments, a directional 3D sound effects along at least one spatial-axis, the 3D sound effects corresponding to the input attributes and being positioned at different locations from each other along the at least one spatial-axis; and
   playing the first and second characteristic audio segments of the file using the directional 3D sound effects.

18. An apparatus for providing a music file search function, the apparatus comprising:
   an input unit that receives one or more inputs of attributes of a music file to be played:
   an extract unit that extracts a first characteristic segment from the music file according to a first input attribute and a second characteristic segment from the music file according to a second input attribute:
   a 3D-sound generating unit that generates 3D sound from the first characteristic segment of the music file along a first spatial-axis corresponding to the first input attribute and along a second spatial-axis corresponding to the second input attribute: and
   an output unit that outputs the 3D sound 19. A method of providing a music file search function, the method comprising:
   inputting attributes of a music file to be played:
   searching for a first characteristic segment of the music file according to a first input attribute and a second characteristic segment of the music file according to a second input
   generating 3D sound from the first characteristic segment of the music file along a first spatial-axis corresponding to the first input attribute and along a second spatial-axis corresponding to the second input attribute: and outputting the 3D sound 20. An apparatus for providing a music file search function, the apparatus comprising:
   an input unit that receives an input of a first attribute and of a second attribute different from the first attribute, the attributes being of a music file to be played;
   an extract unit that extracts a first characteristic audio segment from the music file according to the first input attribute and a second characteristic audio segment from the music file according to the second input attribute such that the first and second characteristic audio segments are different; and
   a 3D-sound generating unit that generates 3D sound whereby the first characteristic audio segment is generated along a first spatial-axis corresponding to the first attribute and the second characteristic audio segment is generated along a second spatial-axis corresponding to the second attribute.

* * * * *

UNITED STATES PATENT AND TRADEMARK OFFICE
CERTIFICATE OF CORRECTION

PATENT NO. : 7,485,796 B2
APPLICATION NO. : 11/431025
DATED : February 3, 2009
INVENTOR(S) : Hyeon Myeong et al.

It is certified that error appears in the above-identified patent and that said Letters Patent is hereby corrected as shown below:

Title Page, Column 2 (Other Publications), Line 1, change "intertace tot" to --interface for--.

Column 9, Line 55, change "year an" to --year, and an--.

Column 10, Line 7, change "as" to --a--.

Column 10, Lines 10-13, change
"8. A method of providing a music file search function, the method comprising:
inputting a first attribute of a music file to be played and a second attribute of the music file different from the first attribute;" to
--8. A method of providing a music file search function, the method comprising:
     inputting a first attribute of a music file to be played and a second attribute of
          the music file different from the first attribute;--.

Column 10, Line 23, change "an" to --and an--.

Column 10, Line 29, after "file" delete "in.".

Column 10, Line 36, change ""further" to --further--.

Column 10, Line 36, change "generation" to --generating--.

Column 10, Line 37, change "illusion"." to --illusion--.

Column 10, Line 40, change "the_user" to --the user--.

Column 10, Line 42, change "are_extractable" to --are extractable--.

Column 10, Line 51, change "seciments" to --segments--.

Column 10, Line 54, change "segment, a" to --segments,--.

Column 11, Lines 6-7, change "and outputting the first and second characteristic audio segments as sound." to
--and
  outputting the first and second characteristic audio segments as sound.--.

Column 11, Line 19, change "a directional" to --directional--.

UNITED STATES PATENT AND TRADEMARK OFFICE
CERTIFICATE OF CORRECTION

PATENT NO. : 7,485,796 B2
APPLICATION NO. : 11/431025
DATED : February 3, 2009
INVENTOR(S) : Hyeon Myeong et al.

It is certified that error appears in the above-identified patent and that said Letters Patent is hereby corrected as shown below:

Column 11, Line 29, change "played:" to --played;--.

Column 11, Line 33, change "attribute:" to --attribute;--.

Column 12, Line 3, change "attribute:" to --attribute;--.

Column 12, Line 4, after "sound" insert --.--.

Column 12, Lines 7-16, change
"inputting attributes of a music file to be played:
searching for a first characteristic segment of the music file according to a first input
 attribute and a second characteristic segment of the music file according to a second
 input
generating 3D sound from the first characteristic segment of the music file along a first
 spatial-axis corresponding to the first input attribute and along a second spatial-axis
 corresponding to the second input attribute: and outputting the 3D sound" to
--inputting attributes of a music file to be played;
searching for a first characteristic segment of the music file according to a first input
 attribute and a second characteristic segment of the music file according to a second
 input attribute;
generating 3D sound from the first characteristic segment of the music file along a first
 spatial-axis corresponding to the first input attribute and along a second spatial-axis
 corresponding to the second input attribute; and
outputting the 3D sound.--.

Signed and Sealed this

Sixteenth Day of June, 2009

JOHN DOLL
*Acting Director of the United States Patent and Trademark Office*